(12) United States Patent
Wang et al.

(10) Patent No.: US 9,173,006 B2
(45) Date of Patent: Oct. 27, 2015

(54) METHOD FOR LIVE BROADCASTING IN A DISTRIBUTED NETWORK AND APPARATUS FOR THE SAME

(75) Inventors: Wenyu Wang, Shanghai (CN); Wei Zhu, Shanghai (CN); Xin Yao, Shanghai (CN)

(73) Assignee: SYNACAST COMPUTER SYSTEM (SHANGHAI), Shanghai (CN)

( * ) Notice: Subject to any disclaimer, the term of this patent is extended or adjusted under 35 U.S.C. 154(b) by 1285 days.

(21) Appl. No.: 12/952,964

(22) Filed: Nov. 23, 2010

(65) Prior Publication Data

US 2011/0126256 A1 May 26, 2011

(30) Foreign Application Priority Data

Nov. 25, 2009 (CN) .......................... 2009 1 0199347

(51) Int. Cl.
| | |
|---|---|
| H04N 21/63 | (2011.01) |
| H04L 29/08 | (2006.01) |
| H04L 29/06 | (2006.01) |
| H04N 21/236 | (2011.01) |
| H04N 21/434 | (2011.01) |
| H04N 21/435 | (2011.01) |
| H04N 21/222 | (2011.01) |
| H04N 21/232 | (2011.01) |
| H04N 21/462 | (2011.01) |
| H04L 12/18 | (2006.01) |

(52) U.S. Cl.
CPC ............ *H04N 21/63* (2013.01); *H04L 12/1863* (2013.01); *H04L 67/104* (2013.01); *H04L 67/1063* (2013.01); *H04L 67/1074* (2013.01); *H04L 67/1095* (2013.01); *H04L 67/42* (2013.01); *H04N 21/222* (2013.01); *H04N 21/232* (2013.01); *H04N 21/236* (2013.01); *H04N 21/435* (2013.01); *H04N 21/4344* (2013.01); *H04N 21/4622* (2013.01); *H04N 21/632* (2013.01)

(58) Field of Classification Search
None
See application file for complete search history.

(56) References Cited

U.S. PATENT DOCUMENTS

| | | | |
|---|---|---|---|
| 6,996,623 B1 * | 2/2006 | Kawano et al. ............... | 709/231 |
| 2004/0117437 A1 * | 6/2004 | Frank ............................ | 709/203 |
| 2005/0160154 A1 * | 7/2005 | Raciborski et al. ........... | 709/219 |
| 2006/0212542 A1 * | 9/2006 | Fang et al. .................... | 709/219 |
| 2006/0230107 A1 * | 10/2006 | Yu et al. ........................ | 709/204 |
| 2009/0177792 A1 * | 7/2009 | Guo et al. ..................... | 709/231 |
| 2009/0276803 A1 * | 11/2009 | Weaver ......................... | 725/32 |

OTHER PUBLICATIONS

Pegasus Team, "Bit Torrent Protocol", San Jose State University Computer Engineering Department, Sep. 20, 2006.
BitTorrent,http://www.bittorent.com.
W. Richard Stevens, "TCP/IP Illustrated", ISBN:9787111075660.
Zhang, Xinyan et al., "CoolStreaming/DONet: A Data-Driven Overlay Network for Efficient Live Media Streaming", pp. 1-14.

* cited by examiner

*Primary Examiner* — Ricky Chin
(74) *Attorney, Agent, or Firm* — Haverstock & Owens LLP

(57) ABSTRACT

The present invention has provided a method for live broadcasting in distributed network and means for the same. Wherein the method mainly comprises steps of: tracker servers receive the status report information from the program source connected to the tracker server; generates the status information of the program source based on said status report information; sends status information of the program source to the information synchronization means.

21 Claims, 5 Drawing Sheets

METHOD FOR LIVE BROADCASTING IN A DISTRIBUTED NETWORK AND APPARATUS FOR THE SAME

FIELD OF THE INVENTION

The present invention relates to a method and an apparatus for live broadcasting in distributed network, especially to a method and an apparatus for the stream media live broadcasting based on peer-to-peer protocol.

BACKGROUND OF THE INVENTION

With the rapid development and popularization of Internet, the video technology based on the stream media is used more and more widely. The application mainly focuses on video-on-demand, distance education, video conference, digital library, etc. The transmission of the stream media has strict demand on bandwidth, delay and data loss rate, and other QOS (quality of service) related parameters. With the increase of user amount, traditional Client/Server ('C/S' in short) model has heavy load on central server, which can not guarantee the QOS.

System based on P2P (Peer-to-Peer) protocol has balanced load, self-organization, high fault-tolerant ability, and some other advantage. In the Internet topological structure based on P2P protocol, all user equipments (e.g. personal computer) share the same role, action, responsibility and obligation. The user equipments in this kind of internet topological structure can exchange data with each other while bypassing the central server. Each user equipment can act as either a server or a client end. It can download data from another user equipment and send data to still another user equipment at the same time. Thus, the more user equipments in the network, the higher speed of the data transmission. This structure highly improves the efficiency of the bandwidth and the reliability of the network obviously.

The current P2P based media broadcasting mainly focuses on video-on-demand. With the increasing importance of internet in our daily life, the demand on the network live broadcasting is also increasing. Comparing to the traditional live broadcasting, the network live broadcasting provides users with better initiative control and more choices. Examples are taken as popular match live broadcasting, games live broadcasting, etc. There are a large amount of live broadcasting providers of such activities. The providers publish the data on the Internet, and the audience can select their favorite live broadcasting program conveniently.

Until now, no efficient solution has been found to setup a stable live broadcasting structure with high transmission efficiency.

SUMMARY OF THE INVENTION

To solve the above problem in the existing technology and accomplish the network live broadcasting, the present invention is provided.

According to a first aspect of the invention, there is provided a live broadcasting method used in a tracker server based on a distributed network, comprising: receiving status report information from a program source connected to the tracker server; generating status information of the program source based on said status report information; sending said status information of the program source to an information synchronization means; receiving status response information of said program source from said information synchronization means; updating a program list based on said status response information.

According to a second aspect of the invention, there is provided a live broadcasting method used in an information synchronization means based on a distributed network, comprising: receiving status information of a program source from a plurality of tracker servers respectively; generating status response information of said program source based on the status information of the program source from the plurality of tracker servers, said status response information indicates the current status of said program source; sending said status response information of said program source to the plurality of tracker servers respectively.

According to a third aspect of the invention, there is provided a first live broadcasting device used in a tracker server based on a distributed network, comprising: a first status receiving unit, a first status sending unit and a receiving unit, wherein the first status receiving unit is configured to receive status report information from a program source connected to the tracker server; the first status sending unit is configured to generate status information of the program source based on said status report information and send said status information of the program source to an information synchronization means; the receiving unit is configured to receive status response information of said program source from said information synchronization means and update a program list based on said status response information.

According to a fourth aspect of the invention, there is provided a second live broadcasting device used in an information synchronization means based on a distributed network, comprising: a second status receiving unit, a response information generating unit and a second status sending unit, wherein the second status receiving unit is configured to receive status information of a program source from a plurality of tracker servers respectively; said response information generating unit is configured to generate status response information of said program source based on the status information of the program source from the plurality of tracker servers, said status response information indicates the current status of said program source; said second status sending unit is configured to send said status response information of said program source to the plurality of tracker servers respectively.

The live broadcasting of stream media can be implemented well by setting up the platform for data transitions with the technical solution in the present invention. Furthermore, according to at least one embodiment of the invention, the protocol applied when the program sources exchange information with the servers is the same as that applied when the user equipments exchange information with the servers. With the aid of this protocol setup method, the data source can be hardly found by hackers and hence are protected well. Moreover, this setup mode of the information synchronization means can solve the live broadcasting issue induced by the disconnection between the tracker servers and the program source.

DESCRIPTION OF DRAWINGS

Other features and advantages of the present invention will appear in the following description of non-limiting exemplary embodiments, with reference to the appended drawings. Wherein, similar or same reference signs represent similar or same technical features.

DETAILED DESCRIPTION OF EMBODIMENTS

According to the embodiments of the first and second aspect of the invention, detailed description of the present invention considered in conjunction with the appended drawings will be further provided.

Figure 1:
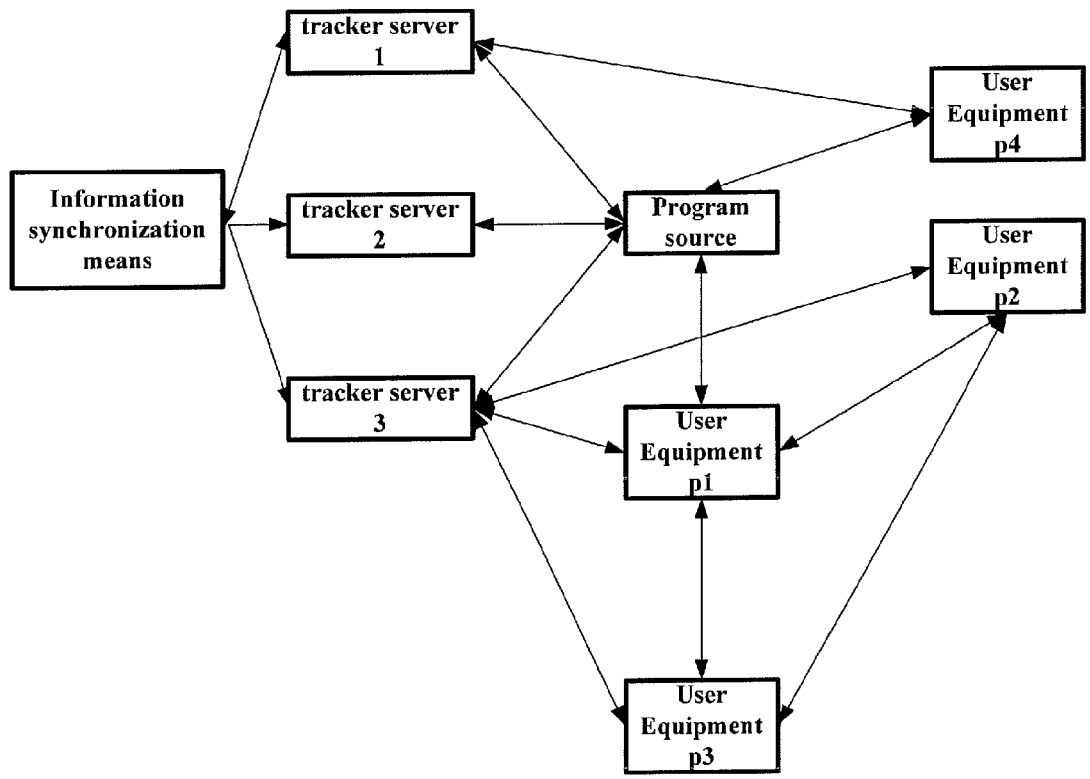
FIG. 1 shows a schematic view of P2P network structure, according to an embodiment of the invention.

FIG. 1 illustrates a schematic diagram of the structure of a P2P network, according to an embodiment of the present invention. The P2P network, as illustrated in FIG. 1, comprises an information synchronization means, a plurality of tracker servers, a program source, and a plurality of user equipments.

Those skilled in the art understand that, network live broadcasting, e.g. video live broadcasting, differing from video-on-demand, has only one program source. The program source will provide the source data block of the live program. The program source connects to some of the user equipments in the network, and can send these user equipments the data blocks of the program corresponding to this program source. The program source connects to every tracker servers respectively, and exchange information with them. Each tracker server connects with a plurality of user equipments in the network. Each tracker server tracks the data block distribution of the user equipments connected to the tracker itself, i.e. the data block(s) stored by the user equipments severally. Each user equipment can get the storage resource status (the user equipments storing the certain data block) corresponding to a special data block (e.g. a data block belonging to a live program) from the tracker server connected to the user equipment itself, and then send a request for getting the data block to the storage resource. Reference will be made to the detailed operation steps as below.

The data block mentioned in the context can be a file or a file piece. Specifically, the file can be a stream media file, for instance, a file in ASF, RM or MKV format.

Figure 2:
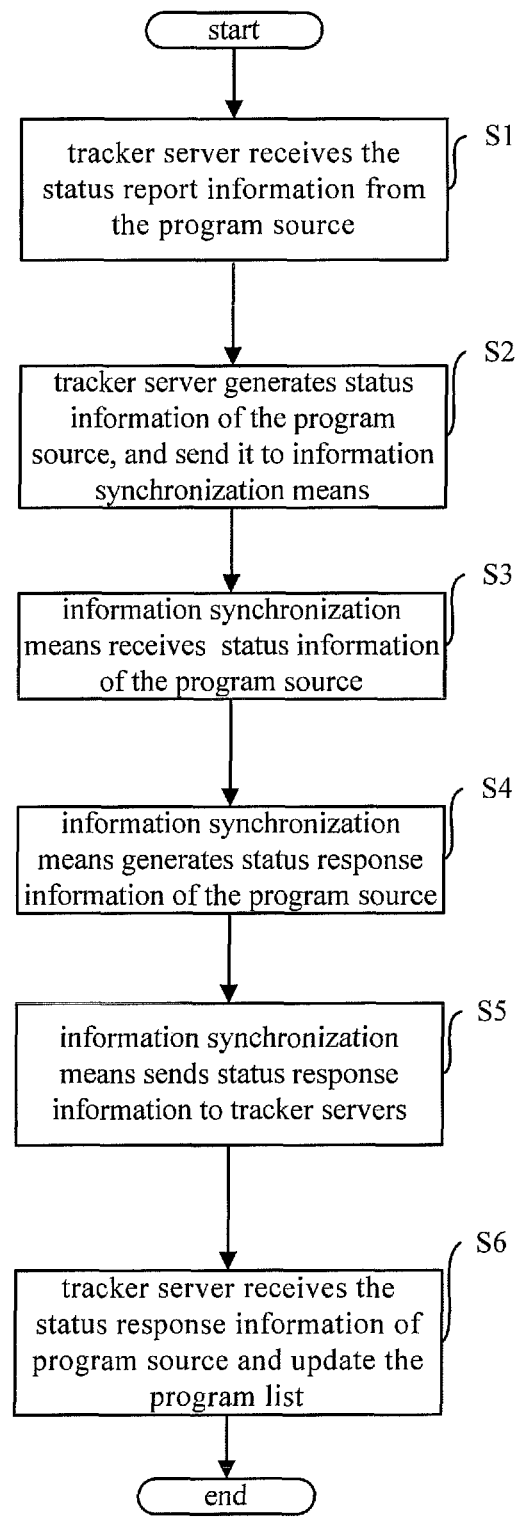
FIG. 2 shows a flowchart of the live broadcasting method according to an embodiment of the invention.

FIG. 2 shows a flowchart of the live broadcasting method according to an embodiment of the invention. The live broadcasting method based on a P2P network will be described in details in conjunction with FIG. 1 and FIG. 2. It should be appreciated that the live broadcasting method is applicable to not only the P2P net work, but also any other distribution network.

In step S1, the tracker sever receives the status report information from the program resource connected to it. Specifically, when the program source joins the P2P network, it will register at all the tracker servers to setup a sub-network. When the program source finishes the registration successfully in the network, it will report its status to each track server regularly. For example, the program source will send a KeepAlive message to each tracker server periodically or aperiodically to inform the tracker servers that the program source is normally broadcasting. When the program source quits the network, it also needs to send a message to the tracker servers. For instance, it can send a Source Exit message to inform the tracker servers that the program source has left the network normally. The tracker servers can know whether the program source is operating normally by monitoring the status report information from the program source. Alternatively, the program source can inform its status to the tracker servers in another way, for example, the program source sends the serial flag information of the current broadcasting data piece to the tracker servers. Specifically, the serial flag information can be the minimum serial number of the data pieces and the maximum serial number of the data pieces in the present broadcasting cache of the program source. If the data block of the whole live program is sliced into a plurality of pieces, at any time point, the live program source can only save a certain quantity of data block pieces in the cache. With the pieces of the whole program flagged by serial number, assuming pieces No. 1001 to No. 1005 have been saved in the cache, the program source will report the data block serial number (1001, 1005) to the tracker server 1.

In step S2, tracker server 1 generates the status information of the program source based on the status report information, and then sends the status information of the program source to the information synchronization means. Tracker server 1 can report the minimum serial number of the data pieces and the maximum serial number of the data pieces to the information synchronization means directly. For example, tracker server 1 sends the smallest serial number of the data piece 1001 and the largest serial number of the data piece 1005 to the information synchronization means as the status information of the program source. Specifically, the information synchronization means can exchange information with the tracker server by the periodical automatic mode, or manual operating mode.

In step S3, the information synchronization means receives status information of the program source from tracker server 1, tracker server 2 and tracker server 3 respectively. Assuming the minimum serial number of the data pieces and the maximum serial number of the data pieces from tracker server 1 are (1001, 1005); the minimum serial number of the data pieces and the largest serial number of the data pieces received from tracker server 2 are (1002, 1006); the minimum serial number of the data piece and the maximum serial number of the data piece received from tracker server 3 are (1001, 1005). Those skilled in the art understand that, if the program source sends the status information of the program source to all the tracker servers at the same time, all the status information of the program source reported to the information synchronization means by the tracker servers should be the same theoretically. The program source can also report the status information of the program source to the tracker servers asynchronously. In such situation, the status information of program source received by the information synchronization means from different track servers could be different.

In step S4, the information synchronization means generates the status response information of program source based on the status information of the program source from the plurality of tracker servers, the status response information indicates the current status of the program source, and the current status could be normal broadcasting or broadcasting stop. Specifically, the information synchronization means compare the status information of the program source from the plurality of tracker servers with the serial flag backup information at first. The serial flag backup information can be obtained from the status information of the program source in the last generating cycle. Preferably, the status information of the program source in the last generating cycle can be selected as the comparing reference of the serial flag backup information in the current cycle. Suppose that the status information received in the last generating cycle are (980, 985), (980, 985) and (983, 985) respectively, the serial flag backup information of the current cycle will be (983, 985). Comparing the status information of the program source in the current cycle (1001, 1005), (1002, 1006), (1001, 1005) with the serial flag backup information (983, 985), the conclusion is that tracker server 1, tracker server 2 and tracker server 3 all obtained the normal broadcasting signal from the program source, thus the status response information of the program source is normal broadcasting.

Those skilled in the art can understand that, to the live-broadcasting system, one critical key point should be taken into account when judging if the live program source is working normally is: whether the serial flag information of the broadcasting data block piece is updated. If the serial flag information is updated, the data block piece is broadcasting normally; otherwise, it may indicate broadcasting stop or connecting error. Supposing that the program source can not connect normally with one tracker server, e.g. tracker server 1, tracker server 1 can not obtain the updated status information of the program source. If the status information of the program source reported by tracker server is (980, 985) in the current cycle, the status of the program source is broadcasting stop for tracker server 1. If for other tracker servers, the status of the program source is broadcasting normally, it can be concluded that connecting errors exist between tracker server 1 and the program source, and the program source is still working normally. Thus, the status response information is normal broadcasting. If for all the tracker servers, the status of the program source is broadcasting stop, it can be concluded that the broadcasting of the program stopped or the program source is running error. Thus, the status response information of the program source is down. Alternatively, in another embodiment, if any one of the serial flag information from the tracker servers lags behind the serial flag backup information, then the program source is considered as normal broadcasting. People skilled in the art can understand, if the program source stops broadcasting, then none of the tracker servers can report the information synchronization means the serial flag information which lags behind the serial flag backup information. Preferably, if the program source is broadcasting normally, the latest serial flag information in current cycle can be selected as the serial flag backup information. For example, in previous assumption, use (1002, 1006) as the serial flag backup information.

In step S5, the information synchronization means sends the status response information generated in step S4 to track server 1, track server 2 and tracker server 3 respectively.

In step S6, the tracker servers receive the status response information of the program source from the information synchronization means, and then update the program list according to the status response information. Preferably, if the status response information indicates that the program source is not broadcasting, the program source will be deleted from the downloadable list of the network. For video live-broadcasting network, the downloadable list can be the program list which can be used by the user equipments. If the status response information indicates that the program source is broadcasting normally, keep the program source in the downloadable list. Thus, the status synchronization of the live program source on all tracker servers has finished.

Figure 3:
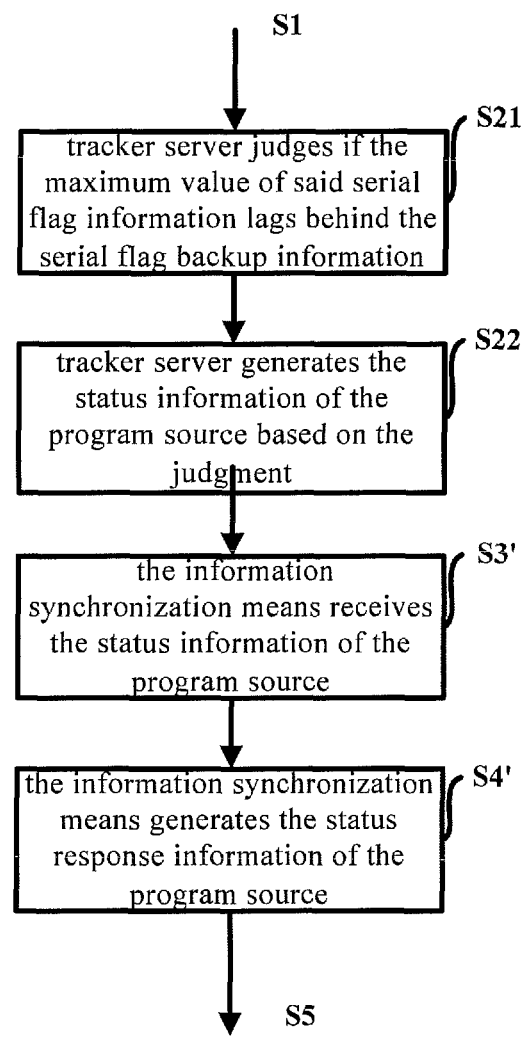
FIG. 3 shows a flowchart of the live broadcasting method according to an embodiment of the invention.

Alternatively, this embodiment also has a variation. The variation will be described in detail in conjunction with FIG. 1 and FIG. 3.

Step S1' is the same as step S1 in the previous embodiment, which will not be described in detail herein.

Step S2' comprises two sub-steps S21 and S22. Wherein, the status report information comprises the serial flag information of the current broadcasting data piece from said program source. Optimally, it comprises the minimum serial number of the data pieces and the largest serial number of the data pieces in the broadcasting cache of the program source. In step 21, the track server judges if the serial flag information lags behind the serial flag backup information. In step 22, status information of the program source is generated based on the judgment in step S21. If the serial flag information lags behind the serial flag backup information, the status information of the program source is normal broadcasting, and then the serial flag information will be set as the updated serial flag backup information. If the serial flag information doesn't lag behind the serial flag backup information, the status information of the program source is broadcasting stop. Those skilled in the art shall understand, the difference between this embodiment and the previous one is: in the embodiment, it is the tracker server who monitors the status of the connection between the program source and itself, uses the status of the connection as the status information of the program source, and then sends the status information of the program source to the information synchronization means; in the previous embodiment, the track server will send the program report information to the information synchronization means, and then the information synchronization means will judge the status of the program source in a centralized way. That is to say, in this embodiment, the status information of the program source reported to the information synchronization means can be normal broadcasting or broadcasting stop directly.

In step S3', the information synchronization means receives the status information of the program source from the tracker servers.

In step S4', the information synchronization means generates the status response information of the program source based on the status information of the program source from the plurality of tracker servers. If the above status information of the program sources indicates that the program sources connected to the same tracker server is more than the program sources not connected to a tracker server, the status response information is normal broadcasting; otherwise, the status response information is broadcasting stop. For example, if the status information of the program source from tracker server 1 indicates that the program source is not broadcasting, and the status information of the program source from tracker server 2 and tracker server 3 indicates that the program source is broadcasting normally, the status response information will indicate that the program source is broadcasting normally.

Step S5 and step S6 in this embodiment are the same as the corresponding steps in the previous embodiment, which will not be described in detail herein.

A still another embodiment of the present invention focuses on the situation when a new program source requests to enter the network. In step S1", a tracker server receives the register request information from a program source, and then informs the information synchronization means that a new program source is requesting to register in step S2". The information synchronization means receives the register request information from the new program source in step S3", and then makes judgment and generates the status response information in step S4". The status response information indicates that the program source is allowed to register. Next, in step S5", the information synchronization means sends the status response information to the tracker servers. Each tracker server accepts the status response information in step S6", and add the new program source into its downloadable list. By implementing the technical solution in this embodiment, the program source only needs to register in one tracker server while its information could be added into the program list of all the tracker servers.

In all embodiments above, every tracker server can comprise one main tracker server and at least one proxy tracker server. When the protocol used by the main tracker server is blocked and the user equipments in the network can not exchange information with the main tracker server, the gateway can be changed automatically to connect the user equipments with the proxy tracker server to solve this problem. Preferably, the main tracker server can be a UDP (user datagram protocol) tracker server, and the proxy tracker server can be a TCP tracker server. Furthermore, the proxy tracker server can only handle the inquiring request from the user equipments. The inquiring request is used to inquire which user equipments are downloading the live data block from a certain program source.

Figure 4:
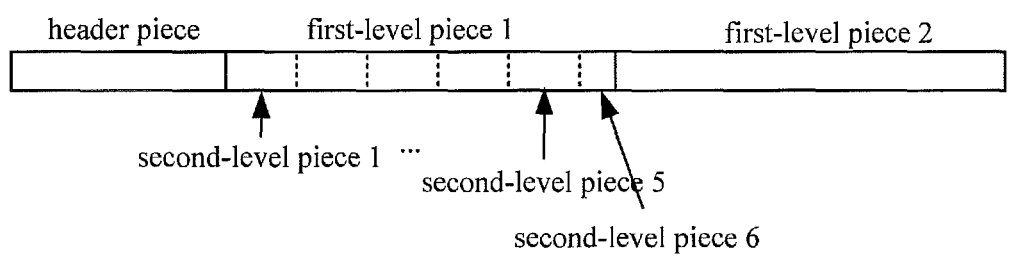
FIG. 4 shows a schematic drawing of the structure of the data block pieces according to an embodiment of the invention.

Preferably, the data block can be in two-level slicing mode. FIG. 4 shows the schematic drawing of the structure of the data block pieces according to an embodiment of the invention. The two-level slicing mode will be described in detail in conjunction with FIG. 4.

First of all, the stream media data block is sliced into first-level pieces according to the characteristic of the data block. The whole header of the data block will be taken as a header piece, and the rest data part of the data block will be sliced into a plurality of first-level pieces with predetermined size. For example, the size of the header piece is 5k, and the sizes of other first-level pieces are 6.6k. Next, each first-level piece is further sliced into a plurality of second-level pieces. Preferably, the size of every second-level piece is 1.3k. Those skilled in the art can understand, according to the UDP protocol, the maximum allowable size of a transmission unit (also referred to as MTU) like a data packet transmitted in the network is 1.4k. Preferably, by selecting 1.3k as the size of a second-level piece, the efficiency of the network transmission can be improved. According to such slicing mode, the header piece can be sliced into three 1.3k second-level pieces and one 1.1k second-level piece. Each 6.6k first-level piece can be sliced into five 1.3k second-level pieces and one 0.1k second-level piece. People skilled in the art can understand the advantage of this two-level slicing mode is that: the stream media data block is broadcast or checked by first-level piece; the data block is transmitted by second-level piece. Thus, the validity of the data block transmission is satisfied, and the data block transmission speed is improved. Preferably, the data block pieces mentioned in the technical solution of the present invention could be second-level pieces.

According to the embodiments of the third and the fourth aspect of the invention, detailed description of the devices in the present invention considered in conjunction with the appended drawings will be further provided.

FIG. 1 illustrates a schematic diagram of the structure of a P2P network, according to an embodiment of the present invention. The P2P network, as illustrated in FIG. 1, comprises an information synchronization means, a plurality of tracker servers, a program source, and a plurality of user equipments.

Those skilled in the art understand that, network live broadcasting, e.g. video live broadcasting, differing from video-on-demand, has only one program source. The program source will provide the source data block of the live program. The program source connects to some of the user equipments in the network, and can send these user equipments the data blocks of the program corresponding to this program source. The program source connects to every tracker servers respectively, and exchange information with them. Each tracker server connects with a plurality of user equipments in the network. Each tracker server tracks the data block distribution of the user equipments connected to the tracker itself, i.e. the data block(s) stored by the user equipment severally. Each user equipment can get the storage resource status (the user equipments storing the certain data block) corresponding to a special data block (e.g. a data block belonging to a live program) from the tracker server connected to the user equipment itself, and then send the request for getting the data block to the storage resource. Reference will be made to the detailed operation steps as below.

The data block mentioned in the context can be a file or a file piece. Specifically, the file can be a stream media file, for instance, a file in ASF, RM or MKV format.

Figure 5:
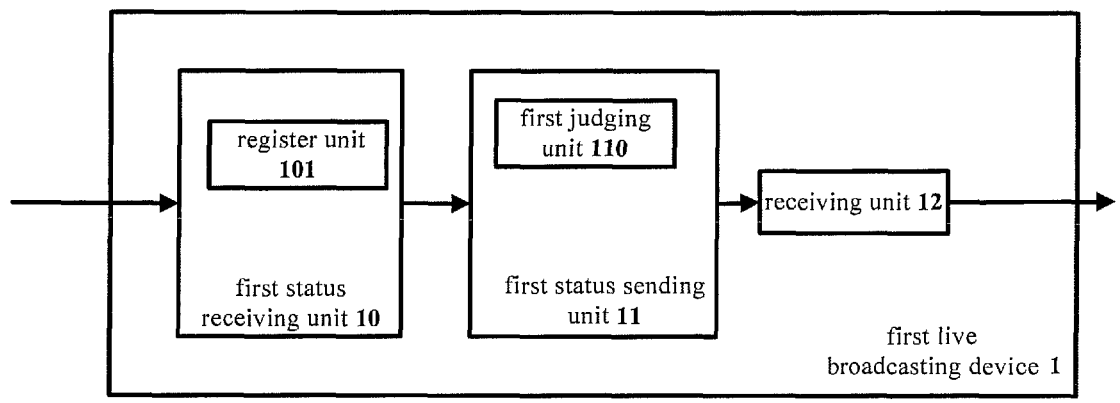
FIG. 5 shows a block diagram of the live broadcasting device used in the tracker server according to an embodiment of the invention.
Figure 6:
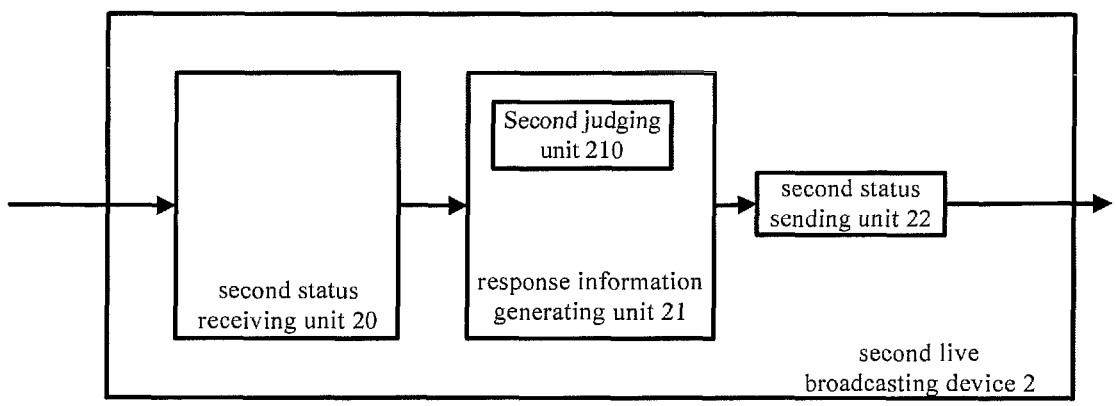
FIG. 6 shows a block diagram of the live broadcasting device used in the information synchronization means according to an embodiment of the invention.

FIG. 5 shows the block diagram of the first live broadcasting device according to an embodiment of the invention. The first live broadcasting device comprises a first status receiving unit 10, a first status sending unit 11 and a receiving unit 12. FIG. 6 shows the block diagram of the second live broadcasting device according to an embodiment of the invention. The second live broadcasting device comprises a second status receiving unit 20, a response information generating unit 21 and a second status sending unit 22. The first live broadcasting device and the second live broadcasting device will be described in detail in conjunction with FIG. 1 and FIG. 2. It should be appreciated that the live broadcasting device is applicable to not only the P2P net work, but also any other distribution network.

The tracker sever receives the status report information from the program resource connected to it via the first status receiving unit. Specifically, when the program source joins the P2P network, it will register at all the tracker servers to setup the sub-network. When the program source finishes the registration successfully in the network, it will report its status to each track server regularly. For example, the program source will send a KeepAlive message to each tracker server periodically or aperiodically to inform the tracker servers that the program source is normally broadcasting. When the program source quits the network, it also needs to send a message to the tracker server. For instance, it can send a Source Exit message to inform the tracker servers that the program source has left the network normally. The tracker servers can know whether the program source is operating normally by monitoring the status report information from the program source. Alternatively, the program source can inform its status to the tracker servers in another way, for example, the program source sends the serial flag information of the current broadcasting data piece to the tracker servers. Specifically, the serial flag information can be the minimum serial number of the data pieces and the maximum serial number of the data pieces in the present broadcasting cache of the program source. If the data block of the whole live program is sliced into a plurality of pieces, at any time point, the live program source can only save a certain quantity of data block pieces in the cache. With the pieces of the whole program flagged by serial number, assume pieces No. 1001 to No.1005 have been saved in the cache, the program source will report the data block serial number (1001, 1005) to the tracker server 1.

The first status sending unit 11 generates the status information of the program source based on the status report information, and then sends the status information of the program source to the information synchronization means. It can report the minimum serial number of the data pieces and the maximum serial number of the data pieces to the information synchronization means directly. For example, the first status sending unit will send the minimum serial number of the data piece 1001 and the maximum serial number of the data piece 1005 to the information synchronization means as the status information of the program source. Specifically, the information synchronization means can exchange information with the tracker server by the periodical automatic mode, or manual operating mode.

The information synchronization means receives status information of the program source from tracker server 1, tracker server 2 and tracker server 3 via the second status receiving unit 20 respectively. Assuming the minimum serial number of the data pieces and the maximum serial number of the data pieces received from tracker server 1 are (1001, 1005 ); the minimum serial number of the data pieces and the maximum serial number of the data piece received from tracker server 2 are (1002, 1006 ); the minimum serial number of the data pieces and the maximum serial number of the data pieces received from tracker server 3 are (1001, 1005). Those skilled in the art understand that, if the program source sends the status information of the program source to all the tracker servers at the same time, all the status information of the program source reported to the information synchronization means by the tracker servers should be the same theoretically. The program source can also report the status information of the program source to the tracker servers asynchronously. In such situation, the status information of program source received by the information synchronization means from different track servers could be different.

The response information generating unit 21 generates the status response information of program source based on the status information of the program source from the plurality of tracker servers, the status response information indicates the current status of the program source, and the current status could be normal broadcasting or broadcasting stop. Specifically, the information synchronization means can compare the status information of the program source from the plurality of tracker servers with the serial flag backup information at first. The serial flag backup information can be obtained from the status information of the program source in the last generating cycle. Preferably, the status information of the program source in the last generating cycle can be selected as the comparing reference of the serial flag backup information in the current cycle. Suppose that the status information received in the last generating cycle are (980, 985), (980, 985 ) and (983, 985 ) respectively, the serial flag backup information of the current cycle will be (983, 985 ). Comparing the status information of the program source in the current cycle (1001, 1005), (1002, 1006 ), (1001, 1005 ) with the serial flag backup information (983, 985), the conclusion is that tracker server 1, tracker server 2 and tracker server 3 all obtained the normal broadcasting signal from the program source, thus the status response information of the program source is normal broadcasting.

Those skilled in the art can understand that, to the live-broadcasting system, one critical key point should be taken into account when judging if the live program source is working normally is: whether the serial flag information of the broadcasting data block piece is updated. If the serial flag information is updated, the data block piece is broadcasting normally; otherwise, it may indicate broadcasting stop or connecting error. Supposing that the program source can not connect normally with one tracker server, e.g., with tracker server 1, tracker server 1 can not obtain the updated status information of the program source. If the status information of the program source reported by tracker server is (980, 985) in the current cycle, the status of the program source is broadcasting stop for tracker server 1. If for other tracker servers, the status of the program source is broadcasting normally, it can be concluded that connecting errors exist between tracker server 1 and the program source, and the program source is still working normally. Thus, the status response information is normal broadcasting. If for all the tracker servers, the status of the program source is broadcasting stop, it can be concluded that the broadcasting of the program stopped or the program source is down. Thus, the status response information of the program source is broadcasting stop. Alternatively, in another embodiment, if any one of the serial flag information from the tracker servers lags behind the serial flag backup information, the program source is considered as normal broadcasting. People skilled in the art can understand, if the program source stops broadcasting, then none of the tracker servers can report the information synchronization means the serial flag information which lags behind the serial flag backup information. Preferably, if the program source is broadcasting normally, the latest serial flag information in current cycle can be selected as the serial flag backup information. For example, in previous assumption, use (1002, 1006) as the serial flag backup information.

The information synchronization means sends the status response information generated by the response information generating unit 21 to track server 1, track server 2 and tracker server 3 respectively via the second status sending unit 22.

Then, via the receiving unit 12, tracker servers receive the status response information of the program source from the information synchronization means, and then update the program list according to the status response information. Preferably, if the status response information indicates that the program source is not broadcasting, the program source will be deleted from the downloadable list of the network. For video live-broadcasting network, the downloadable list can be the program list which can be used by the user equipments. If the status response information indicates that the program source is broadcasting normally, keep the program source in the downloadable list. Thus, the status synchronization of the live program source on all tracker servers has finished.

Alternatively, this embodiment also has a variation. The variation will be described in details below.

The first status receiving unit 10' functions in the same as the first status receiving unit 10 does in the previous embodiment, which will not be described in detail herein.

The first status sending unit 11' further comprises a first judging unit 110. Wherein, the status report information comprises the serial flag information of the current broadcasting data piece from said program source. Optimally, it comprises the minimum serial number of the data pieces and the maximum serial number of the data pieces in the broadcasting cache of the program source. The first judging unit 110 will judge if the serial flag information lags behind the serial flag backup information. The first status sending unit 11' will generate the status information of the program source based on the judgment. If the serial flag information lags behind the serial flag backup information, the status information of the program source is normal broadcasting, and then set the serial flag information as the updated serial flag backup information. If the serial flag information doesn't lag behind the serial flag backup information, the status information of the program source is broadcasting stop. Those skilled in the art shall understand, the difference between this embodiment and the previous one is: in this embodiment, it is the tracker server who monitors the status of the connection between the program source and itself, uses the status of the connection as the status information of the program source, and then sends the status information of the program source to the information synchronization means; in the previous embodiment, the track server will send the program report information to the information synchronization means, and then the information synchronization means will monitor the status of the program source in a centralized way. That is to say, in this embodiment, the status information of the program source reported to the information synchronization means can be normal broadcasting or broadcasting stop directly.

The second status receiving unit 20' receives the status information of the program source from the tracker servers.

The response information generating unit 21' generates the status response information of the program source based on the status information of the program source from the plurality of tracker servers. If the above status information of the program sources indicates that the program sources connected to a tracker server is more than the program sources not connected to the same tracker server, the status response information is normal broadcasting; otherwise, the status response information is broadcasting stop. For example, if the status information of the program source from tracker server 1 indicates that the program source is not broadcasting, and the status information of the program source from tracker server 2 and tracker server 3 indicates that the program source is broadcasting normally, the status response information will indicate that the program source is broadcasting normally.

The second status sending unit 22' and the receiving unit 12' in this embodiment function in the same way as the corresponding units in the previous embodiment do, which will not be described in detail herein.

A still another embodiment of the present invention focuses on the situation when a new program source requests to enter the network. Wherein, the first status receiving unit 10" further comprises a register unit 101. The first status receiving unit 10" receives the register request information from a program source, and then informs the information synchronization means that a new program source is requesting to register by the first status sending unit 11". The information synchronization means accepts the register request information from the new program source by the second status receiving unit 20", and then makes judgment and generates the status response information by the response information generating unit 21". The status response information indicates that the program source is allowed to register. Next, the second status sending unit 22" sends the status response information to the tracker servers. Each tracker server accepts the status response by the receiving unit 12", and the register unit 100 adds the new program source into its downloadable list. By implementing the technical solution in this embodiment, the program source only needs to register in one tracker server while its information could be added into the program list of all the tracker servers.

In all embodiments above, every tracker server can comprise one main tracker server and at least one proxy tracker server. When the protocol used by the main tracker server is blocked and the user equipments in the network can not exchange information with the main tracker server, the gateway can be changed automatically to connect the user equipments with the proxy tracker server to solve this problem. Preferably, the main tracker server can be a UDP (user datagram protocol) tracker server, and the proxy tracker server can be a TCP tracker server. Furthermore, the proxy tracker server can only handle the inquiring request from the user equipments. The inquiring request is used to inquire which user equipments are downloading the live data block from a certain program source.

Preferably, the data block can be in two-level slicing mode. FIG. 4 shows the schematic drawing of the structure of the data block pieces according to an embodiment of the invention. The two-level slicing mode will be described in detail in conjunction with FIG. 4.

First of all, the stream data block is sliced into first-level pieces according to the characteristic of the data block. The whole header of the data block will be taken as a header piece, and the rest data part of the data block will be sliced into a plurality of first-level pieces with predetermined size. For example, the size of the header piece is 5k, and the sizes of other first-level pieces are 6.6k. Next, each first-level piece is further sliced into a plurality of second-level pieces. Preferably, the size of every second-level pieces is 1.3k. Those skilled in the art can understand, according to the UDP protocol, the maximum allowable size of a transmission unit (also referred to as MTU) like a data packet transmitted in the network is 1.4k. Preferably, by selecting 1.3k as the size of a second-level piece, the efficiency of the network transmission can be improved. According to such slicing mode, the header piece can be sliced into three 1.3k second-level pieces and one 1.1k second-level piece. Each 6.6k first-level piece can be sliced into five 1.3k second-level pieces and one 0.1k second-level piece. People skilled in the art can understand the advantage of this two-level slicing mode is that: the stream media data block is broadcast or checked by first-level piece; the data block is transmitted by second-level piece. Thus, the validity of the data block transmission is satisfied, and the data block transmission speed is improved. Preferably, the data block pieces mentioned in the technical solution of the present invention could be second-level pieces.

The present invention has provided a method for live broadcasting in distributed network and means for the same. Wherein the method mainly comprises steps of: tracker servers receive the status report information from the program source connected to the tracker server; generates the status information of the program source based on said status report information; sends status information of the program source to the information synchronization means. The information synchronization means receives the status information of the program source from the tracker servers respectively; generates the status response information of said program source based on the said status information of the program source from a plurality of tracker servers, the status response information indicates the current status of said program source; sends said status response information of said program source to said a plurality of tracker servers respectively. Tracker servers receive the status response information from said program source of said information synchronization means, and update the program list based on said status response information. By implementing the live broadcasting method and means in this invention, the problem that user equipments can not receive live-broadcasting data block due to connection error between the tracker server and the program source will be solved. Furthermore, the live-broadcasting program source can be protected effectively from the hacker.

Some embodiments of the present invention are described above. It is to be noted that the present invention is not limited to abovementioned special embodiments, and those skilled in the art could make variations and modifications with the scopes of the appended claims.

What is claimed is:

1. A live broadcasting method used in a tracker server based on a distributed network, comprising the steps of:
   a. receiving status report information from a program source being connected to the tracker server;
   b. generating status information of the program source based on the status report information, sending said status information of the program source to an information synchronization server; and c. receiving status response information of said program source from said information synchronization server, updating a program list based on said status response information;

wherein said status report information comprises serial flag information of a current broadcasting data piece in said program source, the data piece comprising a plurality of data pieces representing sliced pieces or segments of a whole program, and wherein said serial flag information comprises serial numbers identifying a range of the plurality of data pieces in a broadcasting cache of said program source by use of a minimum serial number and a maximum serial number, wherein said step b further comprises:
- b1. judging if said serial flag information lags behind a serial flag backup information; and
- b2. if said serial flag information lags behind the serial flag backup information, taking said status information of the program source as normal broadcasting, setting said serial flag backup information as an updated copy of said serial flag backup information; if said serial flag information doesn't lag behind the serial flag backup information, taking said status information of the program source as broadcasting stop.

2. The method according to claim 1, wherein said step b further comprises:
sending said serial flag information to said information synchronization server.

3. The method according to claim 1, wherein said status response information comprises normal broadcasting or broadcasting stop, said step c comprises:
if said status response information is broadcasting stop, deleting said program source from said program list.

4. The method according to claim 1, wherein said step a further comprises:
receiving registration request information from said program source.

5. The method according to claim 4, wherein said step b further comprises:
informing said information synchronization server that said program source is requesting for registration; and
wherein said step c further comprises:
receiving the status response information of said program source from said information synchronization server, and adding said program source into said program list if said status response information indicates that the registration is allowed.

6. The method according to claim 1, wherein said tracker server comprises a main tracker server and at least one proxy tracker server.

7. The method according to claim 6, wherein said main tracker server comprises a UDP tracker server, and the at least one proxy tracker server comprises a TCP tracker server.

8. A live broadcasting method used in an information synchronization server based on a distributed network, comprising:
A. receiving status information of a program source from a plurality of tracker servers respectively;
B. generating status response information of said program source based on the status information of the program source from the plurality of tracker servers, wherein said status response information indicates a current status of said program source; and
C. sending said status response information of said program source to the plurality of tracker servers respectively;
wherein said status information of said program source comprises serial flag information of a current broadcasting data piece in said program source, the data piece comprising a plurality of data pieces representing sliced pieces or segments of a whole program, and wherein said serial flag information comprises serial numbers identifying a range of the plurality of data pieces in a broadcasting cache of said program source by use of a minimum serial number and a maximum serial number, wherein said step B comprises:
- B11. judging if a maximum value of said serial flag information lags behind a serial flag backup information; and
- B12. if the maximum value of said serial flag information lags behind the serial flag backup information, taking said status information of the program source as normal broadcasting, and setting said serial flag backup information as an updated copy of said serial flag backup information;
if said serial flag information does not lag behind the serial flag backup information, taking said status information of the program source as broadcasting stop.

9. The method according to claim 8, wherein the status information of the program source is register request information of a special program source, said step B further comprises:
generating the status response information of the program source based on said register request information from the plurality of tracker servers, said status response information indicates that a tracker server allows said program source to register.

10. A live broadcasting method used in an information synchronization server based on a distributed network, comprising:
A. receiving status information of a program source from a plurality of tracker servers respectively;
B. generating status response information of said program source based on the status information of the program source from the plurality of tracker servers, wherein said status response information indicates a current status of said program source; and
C. sending said status response information of said program source to the plurality of tracker servers respectively;
wherein said status information of said program source comprises serial flag information of a current broadcasting data piece in said program source, the data piece comprising a plurality of data pieces representing sliced pieces or segments of a whole program, and wherein said serial flag information comprises serial numbers identifying a range of the plurality of data pieces in a broadcasting cache of said program source by use of a minimum serial number and a maximum serial number, wherein said step B comprises:
if the amount of the status information of the program source indicating that the program source is connected to a tracker server is larger than the amount of the status information of the program source indicating that the program source is not connected to a tracker server, taking the status response information as normal broadcasting; otherwise, taking said status response information as broadcasting stop.

11. The method according to claim 10, wherein the status information of the program source is register request information of a special program source, said step B further comprises:
generating the status response information of the program source based on said register request information from the plurality of tracker servers, said status response information indicates that a tracker server allows said program source to register.

12. A first live broadcasting device used in a tracker server based on a distributed network, wherein said first live broadcasting device comprises a first status receiving circuit, a first status sending circuit and a receiving transceiver, wherein the first status receiving circuit receives status report information from a program source connected to the tracker server;

the first status sending circuit generates status information of the program source based on said status report information and send said status information of the program source to an information synchronization server; and the receiving transceiver receives status response information from said program source of said information synchronization server, and update a program list based on said status response information;

wherein said status report information comprises serial flag information of the current broadcasting data piece in said program source, the data piece comprising a plurality of data pieces representing sliced pieces or segments of a whole program, and wherein said serial flag information comprises serial numbers identifying a range of the plurality of data pieces in a broadcasting cache of said program source by use of a minimum serial number and a maximum serial number, wherein said first live broadcasting device further comprises a first judging circuit, which judges if said serial flag information lags behind a serial flag backup information, and if said serial flag information lags behind the serial flag backup information, set said status information of the program source as normal broadcasting, and set said serial flag backup information as an updated copy of said serial flag backup information; if said serial flag information does not lag behind the serial flag backup information, set said status information of the program source as broadcasting stop.

13. The first live broadcasting device according to claim 12, wherein said first status sending circuit further sends said serial flag information to said information synchronization module server.

14. The first live broadcasting device according to claim 12, wherein said status response information comprises normal broadcasting or broadcasting stop, said first live broadcasting device further comprises a deleting circuit, which, if said status response information is broadcasting stop, deletes said program source from said program list.

15. The first live broadcasting device according to claim 12, wherein said status receiving circuit further receives register request information from said program source.

16. The first live broadcasting device according to claim 15, wherein said first status sending circuit further informs said information synchronization server that said program source is requesting for registration;

said receiving transceiver further comprises a register, which, if said status response information indicates that the registration is allowed, adds said program source into said program list.

17. The first live broadcasting device according to claim 12, wherein said tracker server comprises a main tracker server and at least one proxy tracker server.

18. The first live broadcasting device according to claim 17, wherein said main tracker server comprises a UDP tracker server, and the at least one proxy tracker server comprises a TCP tracker server.

19. A second live broadcasting device used in a information synchronization server based on a distributed network, wherein said second live broadcasting device comprises a second status receiving circuit, a response information generating circuit and a second status sending transceiver:

wherein said second status receiving circuit receives status information of a program source from a plurality of trackers;

said response information generating circuit further generates status response information of said program source based on the status information of the program source from a plurality of tracker servers, said status response information indicates the current status of said program source; and said second status sending circuit sends said status response information of said program source to the plurality of tracker servers respectively, wherein said status information of said program source comprises serial flag information of the current broadcasting data piece in said program source, the data piece comprising a plurality of data pieces representing sliced pieces or segments of a whole program, and wherein said serial flag information comprises serial numbers identifying a range of the plurality of data pieces in a broadcasting cache of said program source by use of a minimum serial number and a maximum serial number, wherein said response information generating circuit further comprises a second judging circuit which judges if a maximum value of said serial flag information lags behind a serial flag backup information, and if the maximum value of said serial flag information lags behind a serial flag backup information, take said status information of the program source as normal broadcasting, and set said serial flag backup information as an updated copy of said serial flag backup information;

if said serial flag information doesn't does not lag behind the serial flag backup information, take said status information of the program source as broadcasting stop.

20. A second live broadcasting device used in a information synchronization server based on a distributed network, wherein said second live broadcasting device comprises a second status receiving circuit, a response information generating circuit and a second status sending transceiver:

wherein said second status receiving circuit receives status information of a program source from a plurality of trackers;

said response information generating circuit is further generates status response information of said program source based on the status information of the program source from a plurality of tracker servers, said status response information indicates the current status of said program source; and said second status sending transceiver sends said status response information of said program source to the plurality of tracker servers respectively, wherein said status information of said program source comprises serial flag information of the current broadcasting data piece in said program source, the data piece comprising a plurality of data pieces representing sliced pieces or segments of a whole program, and wherein said serial flag information comprises serial numbers identifying a range of the plurality of data pieces in a broadcasting cache of said program source by use of a minimum serial number and a maximum serial number, wherein if the amount of the status information of the program source indicating that the program source is connected to a tracker server is larger than the amount of the status information of the program source indicating that the program source is not connected to a tracker server, taking the status response information as normal broadcasting; otherwise, taking said status response information as broadcasting stop.

21. The second live broadcasting device according to claim 20, wherein the status information of the program source is the register request information of a special program source, said response information generating circuit further generates the status response information of the program source based on said register request information from a plurality of tracker servers, said status response information indicates that a tracker server allows said program source to register.

* * * * *